United States Patent
Malladi

(10) Patent No.: US 8,493,873 B2
(45) Date of Patent: Jul. 23, 2013

(54) MULTIPLEXING OF SOUNDING SIGNALS IN ACK AND CQI CHANNELS

(75) Inventor: Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1325 days.

(21) Appl. No.: 12/141,000

(22) Filed: Jun. 17, 2008

(65) Prior Publication Data
US 2009/0073955 A1    Mar. 19, 2009

Related U.S. Application Data

(60) Provisional application No. 60/944,779, filed on Jun. 18, 2007, provisional application No. 60/945,076, filed on Jun. 19, 2007.

(51) Int. Cl.
*G01R 31/08* (2006.01)

(52) U.S. Cl.
USPC ........... 370/252; 370/208; 370/342; 370/345; 370/328; 370/332

(58) Field of Classification Search
USPC .......................................... 370/252, 430, 442
See application file for complete search history.

(56) References Cited

U.S. PATENT DOCUMENTS

| | | | |
|---|---|---|---|
| 2001/0008523 A1* | 7/2001 | Song | 370/335 |
| 2005/0068931 A1* | 3/2005 | Cho et al. | 370/345 |
| 2005/0276344 A1* | 12/2005 | Ling et al. | 375/260 |
| 2005/0286402 A1* | 12/2005 | Byun et al. | 370/203 |

(Continued)

FOREIGN PATENT DOCUMENTS

| | | |
|---|---|---|
| RU | 2293441 | 2/2007 |
| WO | WO02039595 | 5/2002 |
| WO | WO2006130742 | 12/2006 |
| WO | WO2007024932 | 3/2007 |

OTHER PUBLICATIONS

LG Electronics Inc., "Consideration on control channel multiplexing structure with/without Sounding RS", R1-072358, 3GPP, May 7, 2007, URL, http://www.3gpp.org/ftp/tsg_ran/WG1_RL1/TSGR1_49/Docs/R1-072358.zip.

(Continued)

*Primary Examiner* — Duc C Ho
(74) *Attorney, Agent, or Firm* — Kenneth K. Vu; Dalei Dong

(57) ABSTRACT

A resource block can include all symbols in a slot for each, generally a multiple of 12, sub-carrier in the resource block. A slot is typically 0.5 milliseconds (ms) and includes 7 symbols for short cyclic prefix (CP) and 6 symbols for long CP. The resource block can include a SRS channel as well as other channels such as an acknowledgement (ACK) channel and a channel quality indication (CQI) channel. Although defined as a separate physical channel the SRS can be multiplex with uplink channels. In accordance therewith, an SRS can be detected in a slot of a 1.0 ms sub-frame constituting two slots, typically one slot but not the other including the SRS. The structure of the slot can be modified to facilitate the multiplexing by, e.g., replacing an existing symbol with the SRS, and a length and a type of a time domain orthogonal spreading code can be determined for each slot as a function of SRS presence.

46 Claims, 16 Drawing Sheets

U.S. PATENT DOCUMENTS

| | | | |
|---|---|---|---|
| 2006/0198338 A1* | 9/2006 | Ishii et al. | 370/329 |
| 2006/0203779 A1* | 9/2006 | Attar et al. | 370/335 |
| 2006/0209970 A1* | 9/2006 | Kanterakis | 375/259 |
| 2006/0282740 A1* | 12/2006 | Gu et al. | 714/749 |
| 2007/0060165 A1* | 3/2007 | Black et al. | 455/450 |
| 2007/0097927 A1* | 5/2007 | Gorokhov et al. | 370/335 |
| 2007/0253499 A1* | 11/2007 | Waters et al. | 375/260 |
| 2008/0075191 A1* | 3/2008 | Haartsen | 375/285 |

OTHER PUBLICATIONS

International Search Report and Written Opinion—PCT/US08/067392—International Search Opinion EPO—Mar. 13, 2009.

Qualcomm Europe: "CDM RS for Demodulationand Channel Sounding" Internet Citation, [Online] No. R1-070653, Feb. 12, 2007, pp. 1/7-7/7, XP002485862, Retrieved from the Internet: URL:http://www.3gpp.org/ftp/tsg_ran/WG1_RL1/TSGR1_48/Docs/R1-070653.zip> [retrieved on Jun. 19, 2008] Section 2.

Qualcomm Europe: "PUCCH (CQI) Structure and Multiplexing" 3GPP Draft; R1-072036, 3rd Generation Partnership Project (3GPP), Mobile Competence Centre ; 650, Route Des Lucioles ; F-06921 Sophia-Antipolis Cedex ; France, vol. tsg_ran\WG1_RL1\TSGR1_49\Docs, no. Kobe, Japan; May 7, 2007, Mar. 7, 2007, XP050105791, Section 2.

Qualcomm Europe: "PUCCH power control—Link level analysis" 3GPP Draft; R1-072017, 3rd Generation Partnership Project (3GPP), Mobile Competence Centre ; 650, Route Des Lucioles ; F-06921 Sophia-Antipolis Cedex ; France, vol. tsg_ran\WG1_RL1\TSGR1_49\Docs, no. Kobe, Japan; May 7, 2007, XP050105773, Section 2.

Toshiba: "PUCCH consideration from implementation perspective" 3GPP Draft; R1-072059, 3rd Generation Partnership Project (3GPP), Mobile Competence Centre ; 650, Route Des Lucioles ; F-06921 Sophia-Antipolis Cedex ; France, vol. tsg_ran\WG1_RL1\TSGR1_49\Docs, no. Kobe, Japan; May 7, 2007, May 2, 2007, XP050105813, Section 2.

QUALCOMM Europe: Proposed Structure for UL ACK and CQI 3GPP Draft; R1-070437, 3rd Generation Partnership Project (3GPP), Mobile Competence Centre; 650, Route Des Lucioles; F-06921 Sophia-Antipolis Cedex; France, vol tsg_ranWGI_RLITSGRI_47bisDocs, no Sorrento, Italy; 20070115, Jan. 9, 2007, XP050104468 paragraph [0001]].

Taiwan Search Report—TW097122780—TIPO—Oct. 4, 2012.

* cited by examiner

MULTIPLEXING OF SOUNDING SIGNALS IN ACK AND CQI CHANNELS

CROSS-REFERENCE TO RELATED APPLICATIONS

This application claims the benefit of U.S. Provisional Patent Application Ser. No. 60/944,779 entitled "METHODS AND APPARATUSES FOR MULTIPLEXING OF UPLINK SOUNDING SIGNALS, ACK AND CQI CHANNELS IN A WIRELESS COMMUNICATION SYSTEM," which was filed Jun. 18, 2007. This application claims the benefit of U.S. Provisional Patent Application Ser. No. 60/945,076 entitled "METHODS AND APPARATUSES FOR MULTIPLEXING OF UPLINK SOUNDING SIGNALS, ACK AND CQI CHANNELS IN A WIRELESS COMMUNICATION SYSTEM," which was filed Jun. 19, 2007. The entireties of the aforementioned applications are herein incorporated by reference.

BACKGROUND

I. Field

The following description relates generally to wireless communications, and more particularly to multiplexing of uplink sounding resource signals (SRS) in an acknowledgement (ACK) or channel quality indication (CQI) channel in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

Recently, a sounding resource signal (SRS) channel has been introduced as a broadband pilot channel. The SRS channel is an orthogonal channel intended to enable frequency selective scheduling for, e.g., physical channels and to serve as a reference for closed loop power control. Generally, the SRS is a separate physical channel that is assigned to each terminal or user device by layer-3 (L3) signaling. Accordingly, the SRS channel is distinct from other channels included in a resource block.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating multiplexing of a sounding resource signal (SRS) in a wireless communication environment. A resource block can include all symbols in a slot for each, generally a multiple of 12, subcarrier in the resource block. A slot is typically 0.5 milliseconds (ms) and includes 7 symbols for short cyclic prefix (CP) and 6 symbols for long CP. The resource block can include a SRS channel as well as other channels such as an acknowledgement (ACK) channel and a channel quality indication (CQI) channel. Although defined as a separate physical channel, the SRS can be multiplex with uplink channels. In accordance therewith, an SRS can be detected in a slot of a 1.0 ms sub-frame constituting two slots, typically one slot but not the other including the SRS. The structure of the slot can be modified to facilitate the multiplexing by, e.g., replacing an existing symbol with the SRS, and a length and a type of a time domain orthogonal spreading code can be determined for each slot as a function of SRS presence.

According to related aspects, a method that facilitates multiplexing of a SRS channel in a wireless communication environment is described herein. The method can include detecting a SRS symbol in a slot of a sub-frame. Further, the method can comprise modifying a channel structure for at least one slot in the sub-frame. Moreover, the method can also include determining a length and a type of a time domain orthogonal spreading code to apply to slots of the sub-frame as a function of SRS presence. Additionally, the method can further comprise applying the determined spreading code to a channel of at least one slot in the sub-frame.

Another aspect relates to a wireless communications apparatus. The wireless communications apparatus can include a memory that retains instructions related to discovering a SRS symbol in a slot of a sub-frame, calculating a type and a length of a time domain orthogonal spreading code to apply to slots of the sub-frame based upon presence of the SRS in the slot, modifying a channel structure for one or more slots in the sub-frame, implementing the calculated spreading code to a channel of one or more slots in the sub-frame. Further, the wireless communications apparatus can include a processor, coupled to the memory, configured to execute the instructions retained in the memory.

Yet another aspect relates to a wireless communications apparatus that enables multiplexing of a SRS channel in a wireless communication environment. The wireless communications apparatus can include means for detecting a SRS symbol in a slot of a sub-frame. Further, the wireless communications apparatus can include means for utilizing presence of the SRS for determining a type and a length of a time domain orthogonal spreading code to apply in one or more slots of the sub-frame. Moreover, the wireless communications apparatus can comprise means for adjusting a channel structure for at least one slot in the sub-frame. Still further, the wireless communications apparatus can comprise means for applying the determined spreading code to at least one slot in the sub-frame.

Still another aspect relates to a computer program product (also referred to as machine-readable medium) having stored thereon code (also referred to as, machine-executable instructions) for detecting a SRS symbol in a slot of a sub-frame included; determining both a type and a length of a time domain orthogonal spreading code to apply to one or more slots of the sub-frame as a function of SRS presence in the one or more slots; changing a channel structure for the slot including the SRS; and utilizing the determined spreading code for at least one slot in the sub-frame.

In accordance with yet another aspect, an apparatus in a wireless communication system can include a processor, wherein the processor can be configured to detect a SRS symbol in a slot of a sub-frame. Moreover, the processor can be configured to calculate a type and a length of a time domain orthogonal spreading code to apply to one or more slots of the sub-frame, the spreading code is calculated as a function of SRS presence in the one or more slots of the sub-frame. Further, the processor can be configured to modify a channel structure of at least one slot in the sub-frame. Additionally, the processor can be configured to apply the spreading code to at the least one slot in the sub-frame.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
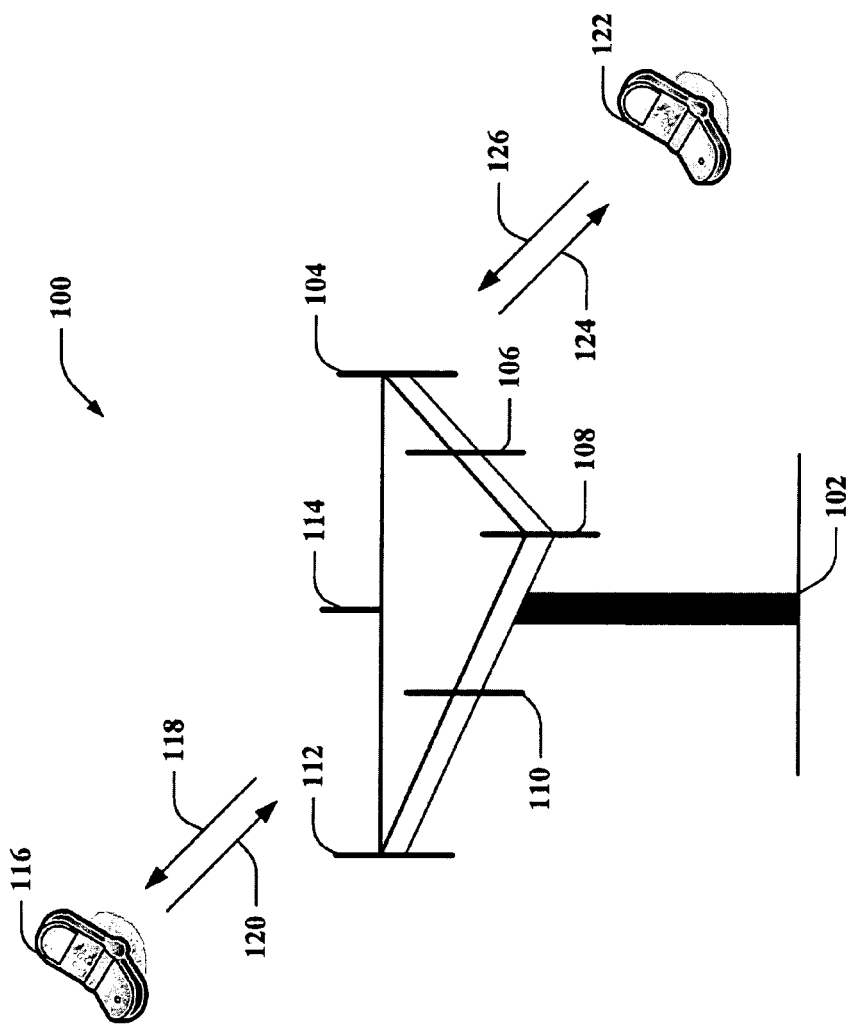
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, eNodeB or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to the drawings with reference initially to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Base station 102, access terminal 116, and/or access terminal 122 can be a transmitting wireless communication apparatus and/or a receiving wireless communication apparatus at a given time. When sending data, the transmitting wireless communication apparatus can employ one or more channels such as a physical uplink control channel (PUCCH), a physical uplink shared channel (PUSCH), a sounding resource signal (SRS) channel, and so forth. The SRS channel is an orthogonal broadband pilot channel specified for two distinct purposes. First, the SRS can enable frequency selective scheduling for, e.g., physical channels. Second, the SRS can serve as a reference for closed loop power control. Generally, the SRS is a separate physical channel that is assigned to each access terminal 116, 122 or other user equipment by layer-3 (L3) signaling. Accordingly, any suitable component or device can periodically transmit an associated SRS with a configurable periodicity. An overview of SRS structure can be found with reference to FIGS. 2A and 2B.

Figure 2A:
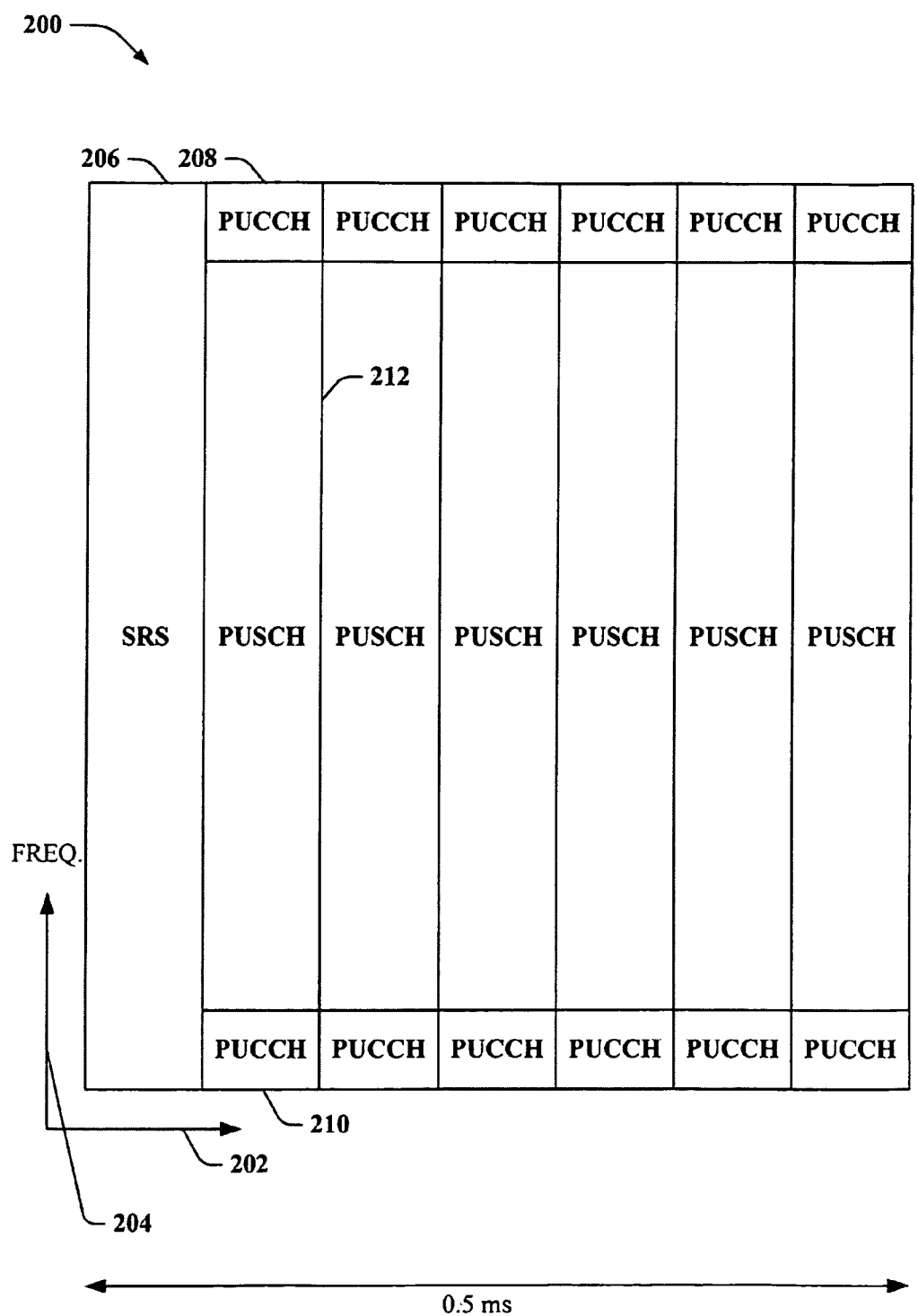
FIG. 2A is a diagram depicts an example illustration of SRS structure for a single slot with short cyclic prefix (CP).

Referring now to FIG. 2A, diagram 200 depicts an illustration of SRS structure for a single slot with short cyclic prefix (CP). As illustrated, a slot represents 0.5 milliseconds (ms) along the time axis 202, with frequency 204 represented in the y-axis direction such that data or channels in the upper portion of diagram 200 are transmitted at higher frequencies. Given short CP is employed in this example, the 0.5 ms slot includes 7 orthogonal frequency division multiplexing (OFDM) symbols. Generally, two contiguous 0.5 ms slots compose a 1.0 ms sub-frame (not shown) wherein 10 sub-frames constitute a 10 ms frame. A resource block (not shown) can be the number of symbols in a slot times a number of subcarriers, typically multiples of 12.

Typically, one localized frequency division multiplexing (LFDM) symbol in every N sub-frames is reserved for SRS 206. Thus, SRS 206 can exist as one of the 7 symbols in the 0.5 ms slot, depicted for convenience here and in other figures described herein as the first symbol, however it should be appreciated that SRS 206 could be at other locations in the slot. PUCCH 208 can be a higher frequency channel, while PUCCH 210 can be a lower frequency channel and the PUSCH is denoted as reference numeral 212.

SRS 206 can be time multiplexed with PUCCH 208, 210 and/or PUSCH 212. Thus, various SRS parameters can be signaled along a channel such as base Zadoff-Chu (ZC)

sequences, a specific cyclic shift, bandwidth span, time and/or frequency hopping structure, and so forth.

Figure 2B:
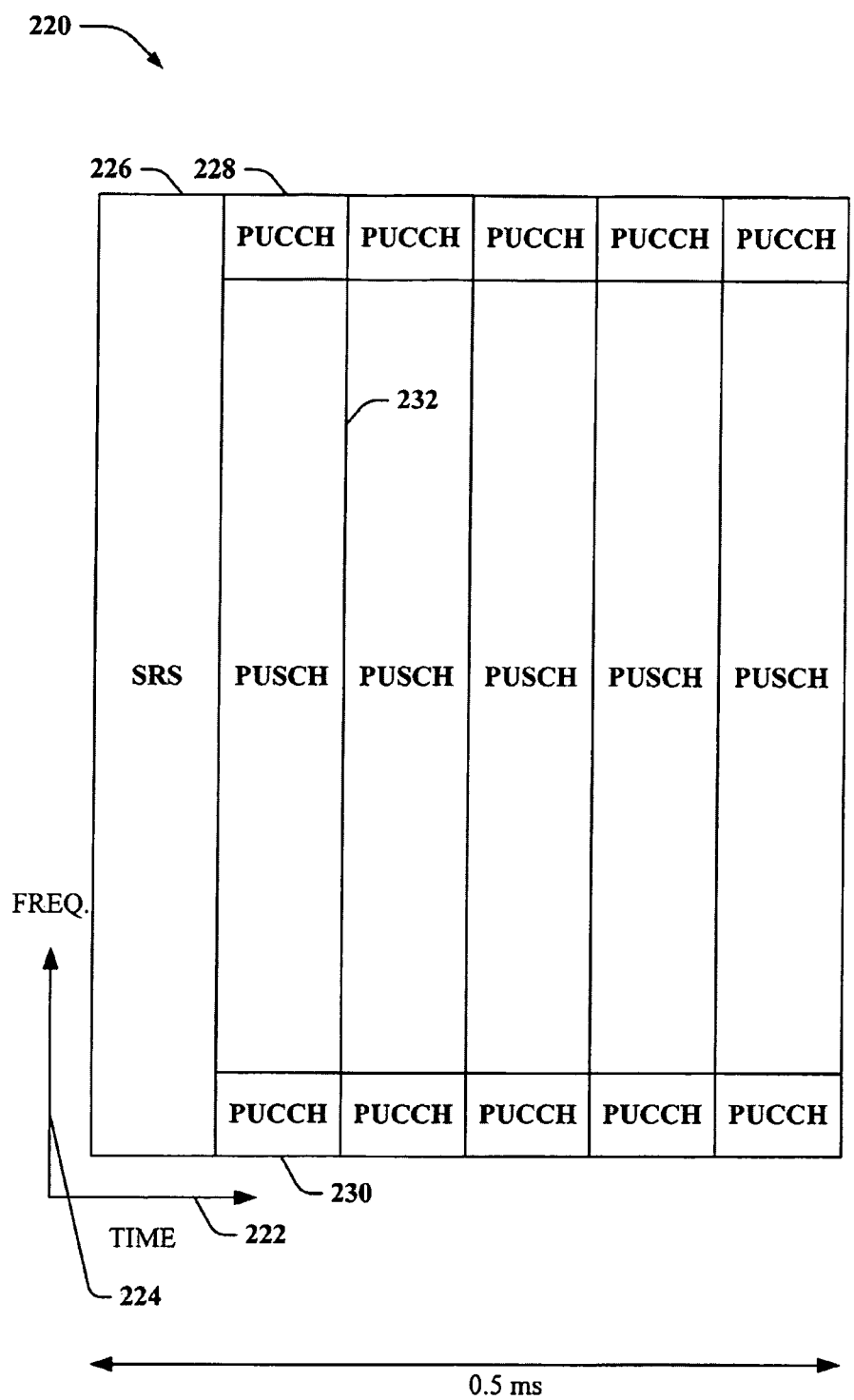
FIG. 2B is a diagram that depicts an example SRS structure for a single slot with long CP.

FIG. 2B illustrates diagram 220 that depicts SRS structure for a single slot with long CP. Appreciably, diagram 220 is substantially similar to diagram 200 of FIG. 2A, with time 222 and frequency 224 dimensions shown along the x-axis and y-axis, respectively, and SRS 226 allocated to one of the symbols in the 0.5 ms slot, spanning all the uplink channels 228-232. One distinction however, is that with long CP, there are typically 6 symbols for each 0.5 ms slot rather than 7 symbols provided with short CP. For the sake of ready understanding, the remainder of this document provides illustrations with respect to short CP where the overall structure is provided in connection with FIG. 2A, but it should be understood that the claimed subject matter can apply to other CP designations such as, e.g., long CP as well as to other SRS structures.

Figure 3:
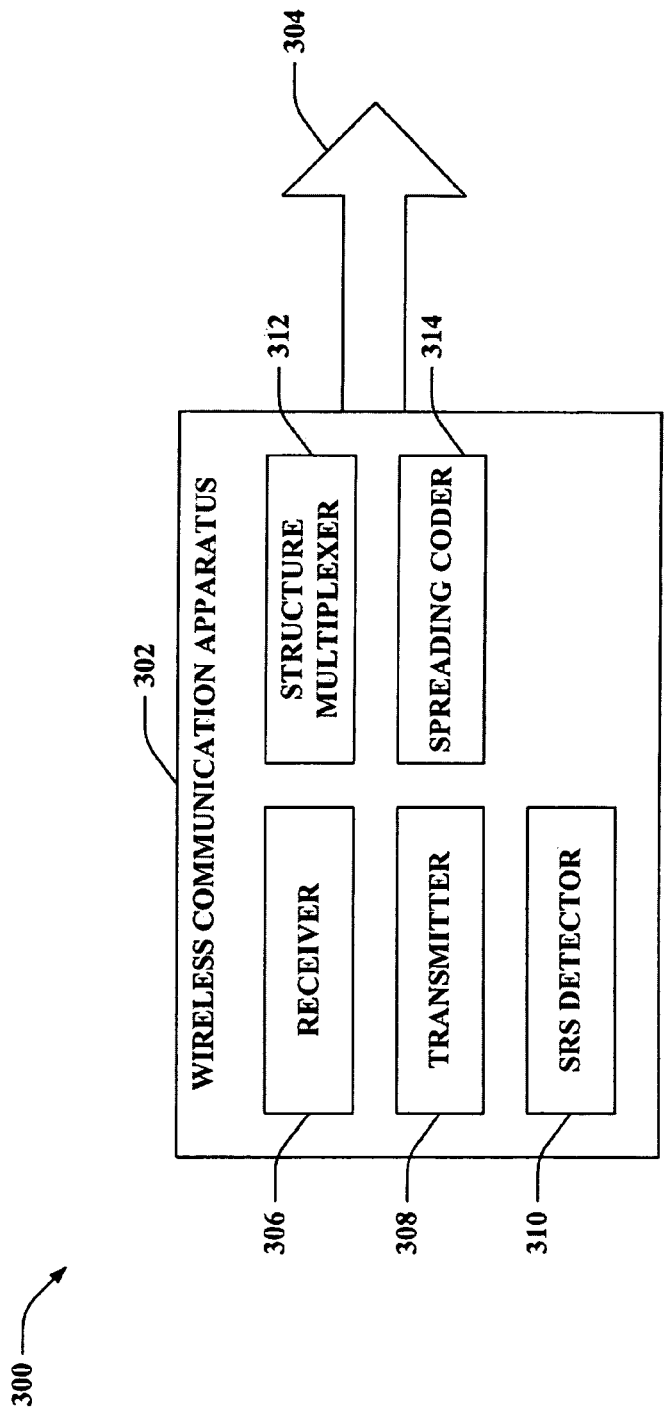
FIG. 3 is an illustration of an example system that can facilitate multiplexing of a SRS in a wireless communication environment.

Now turning to FIG. 3, illustrated is system 300 that can facilitate multiplexing of a SRS in a wireless communication environment. System 300 can include wireless communication apparatus 302 that is shown to be transmitting data via channel 304. Although depicted as transmitting data, wireless communication apparatus 302 can also receive data via channel 304 (e.g., wireless communication apparatus 302 can concurrently transmit and receive data, wireless communication apparatus 302 can transmit and receive data at differing times, a combination thereof, and so forth), for example by way of receiver 306 and transmitter 308. Wireless communication apparatus 302, for instance, can be a base station (e.g., base station 102 of FIG. 1, . . . ), an access terminal (e.g., access terminal 116 of FIG. 1, access terminal 122 of FIG. 1, . . . ), or the like. It should also be appreciated that wireless communication apparatus 302 can be coupled to multiple channels upon which data can be transmitted and/or received although only one channel is here depicted. Moreover, channel 304 can generalize multiple channels with various structures and suited for general or specific purposes such as the uplink physical channels described in FIGS. 4A-5C, which can be referenced in tandem with FIG. 3 in order to illustrate various features of wireless communication apparatus 302 as well as features of other components or devices described herein.

Figure 4A:
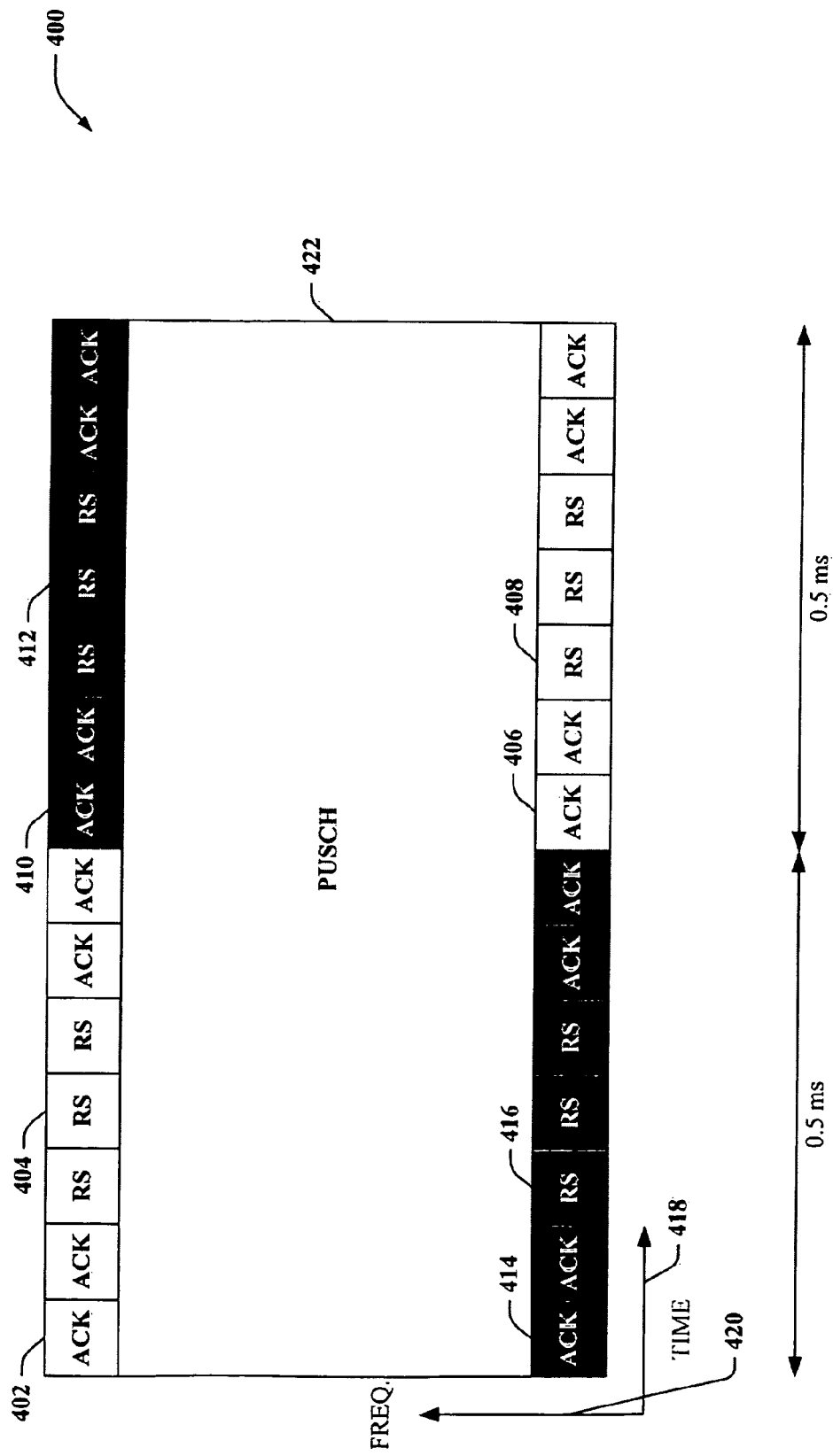
FIG. 4A is an illustration of an example sub-frame 400 detailing acknowledgement (ACK) channel multiplexing in the absence of a sounding RS.

FIG. 4A depicts an example sub-frame 400 detailing acknowledgement (ACK) channel multiplexing in the absence of a sounding RS. Sub-frame 400 represents 1.0 ms of time 418 (with a frequency 430 dimension depicted as the y-axis) that can be divided into two 0.5 ms slots similar in channel structure to the slot 200 diagramed in FIG. 2A, with short CP employed and 7 symbols per slot included in a resource block. However, unlike slot 200, in this case, no sounding RS is present in either slot of subframe 400. Illustrated in the upper portion of the first 0.5 ms slot are four ACK symbols 402 and three reference signal (RS) symbols 404. RS symbols 404 are a pilot structure generally employed for demodulation of the ACK channel or another associated channel. Typically, ACK 402 and RS 404 symbols are transmitted in the PUCCH regions. Thus, the relationship to the structures depicted in FIGS. 2A and 2B can be readily appreciated (e.g., PUCCH 208, 210, 228, 230).

Generally, resources for PUSCH 422, are allocated on a sub-frame basis and the transmission frequency 420 can be hopped from sub-frame to sub-frame (e.g., from sub-frame 400 to another sub-frame). In contrast, the PUCCH, which can carry ACK and RS information (as well as channel quality indication (CQI), not acknowledgment (NACK), hybrid automatic repeat request (HARQ), uplink scheduling requests . . . ) can be hopped at slot boundaries to, e.g., provide added reliability. Thus, the boundary between the first 0.5 ms slot and the second 0.5 ms slot can serve as a transmission frequency boundary for hopping in the PUCCH. Accordingly, a particular group of users associated with data from ACK 402 and RS 404 transmitted at an upper portion of the frequency 420 spectrum in the first slot can be hopped to a lower frequency 420 in the second slot as depicted by ACK 406 and RS 408. Likewise, a different group of users associated with ACK 414 and RS 416 in the first slot can be hopped to an upper portion of the spectrum in the second slot to ACK 410 and RS 412. The associated relationships between ACK and RS symbols are depicted with white and black backgrounds, respectively.

In accordance therewith, the nominal PUCCH structure for short CP allows for 18 ACKs per resource block. These 18 ACKs can be allocated 6 frequency domain code division multiplexing (CDM) cyclic shifts for each of 3 time domain CDM orthogonal covers. For long CP, the nominal PUCCH structure allows for 8 ACKs per resource block to account for 4 frequency domain CDM cyclic shifts for each of 2 time domain CDM orthogonal covers.

Figure 4B:
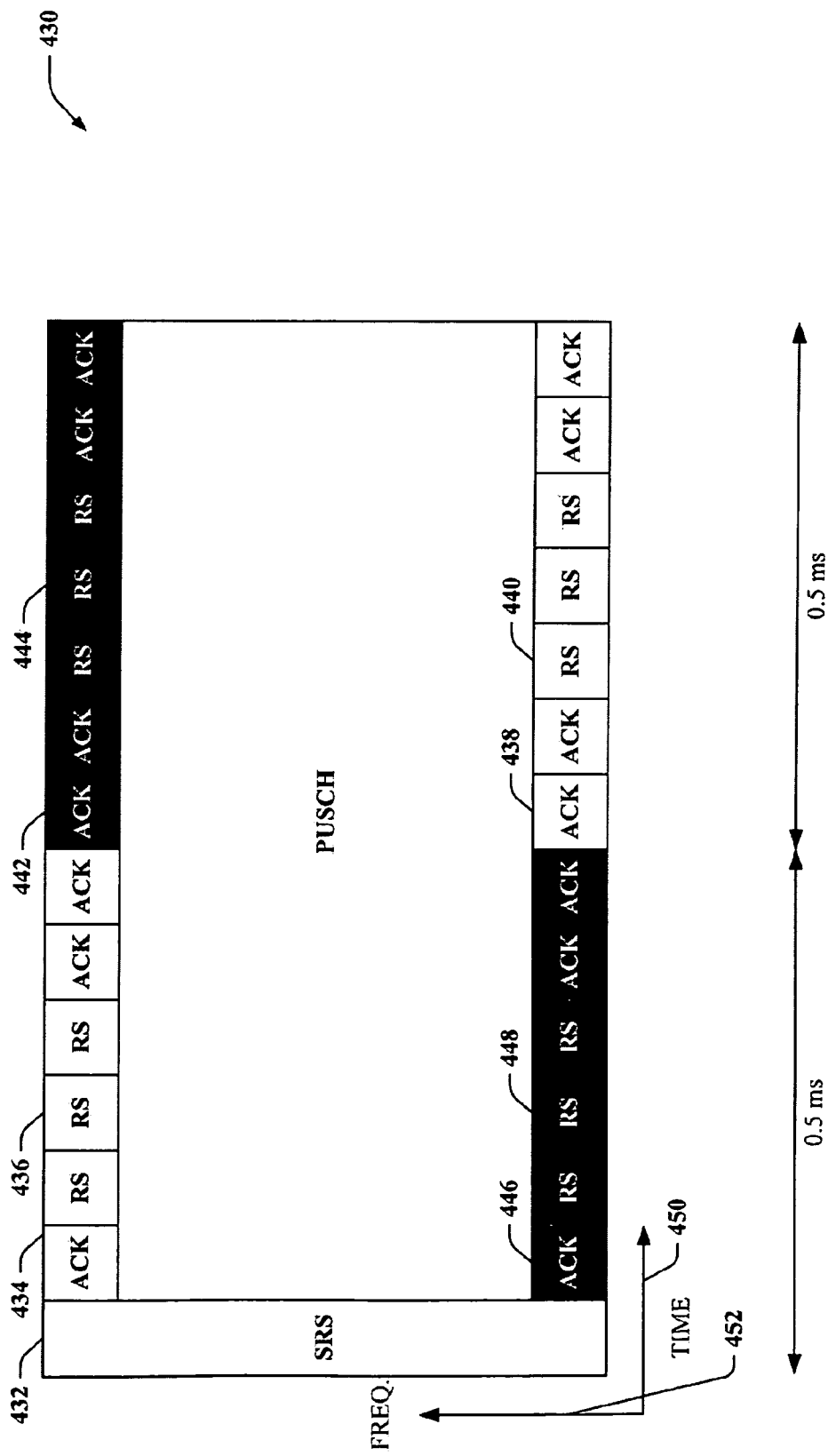
FIG. 4B is an illustration of an example sub-frame 430 detailing ACK channel multiplexing when a sounding RS is present and an ACK symbol is replaced.

Turning now to FIG. 4B, example sub-frame 430 detailing ACK channel multiplexing when a sounding RS is present and an ACK symbol is replaced is depicted. As with sub-frame 400 of FIG. 4A, frequency 452 is represented in the y-axis dimension, and sub-frame 430 represents 1.0 ms of time 450 that can be divided into two 0.5 ms slots, each with similar channel structure as that described in FIG. 2A, with 7 symbols per slot as defined for short CP. However, in this case, the second slot does not include a sounding RS like slot 200 depicts. SRS 432 is depicted in the first position in the first 0.5 ms slot, however, it should be reiterated that SRS 432 could exist at other locations in the slot as well as in a different slot of sub-frame 430. Moreover, SRS 432 could exist in a long CP structure as well although for the sake of brevity and to facilitate rapid understanding of the concepts detailed herein, only short CP is employed for illustration.

Unlike the example nominal sub-frame 400 of FIG. 4A, the first slot in sub-frame 430 includes three ACK symbols 434, 446 rather than four ACK symbols 402, 414, yet the first slot still includes the same number of RS symbols 436, 448 with three. The reason for fewer ACK symbols is due to the existence of SRS 432, which accounts for one of the 7 symbols in a short CP slot. In this case, SRS 432 has replaced one of the four ACK symbols 402, 414 present in sub-frame 400 so that there are only three ACK symbols 434, 446 in the first slot of sub-frame 430. In the second 0.5 ms slot of sub-frame 430, no sounding RS is present so the channel structure has not changed. Accordingly, there are four ACK symbols 438, 442 and three RS symbols 440, 444 just as was the case in the second slot of example sub-frame 400 depicted in FIG. 4A.

Figure 4C:
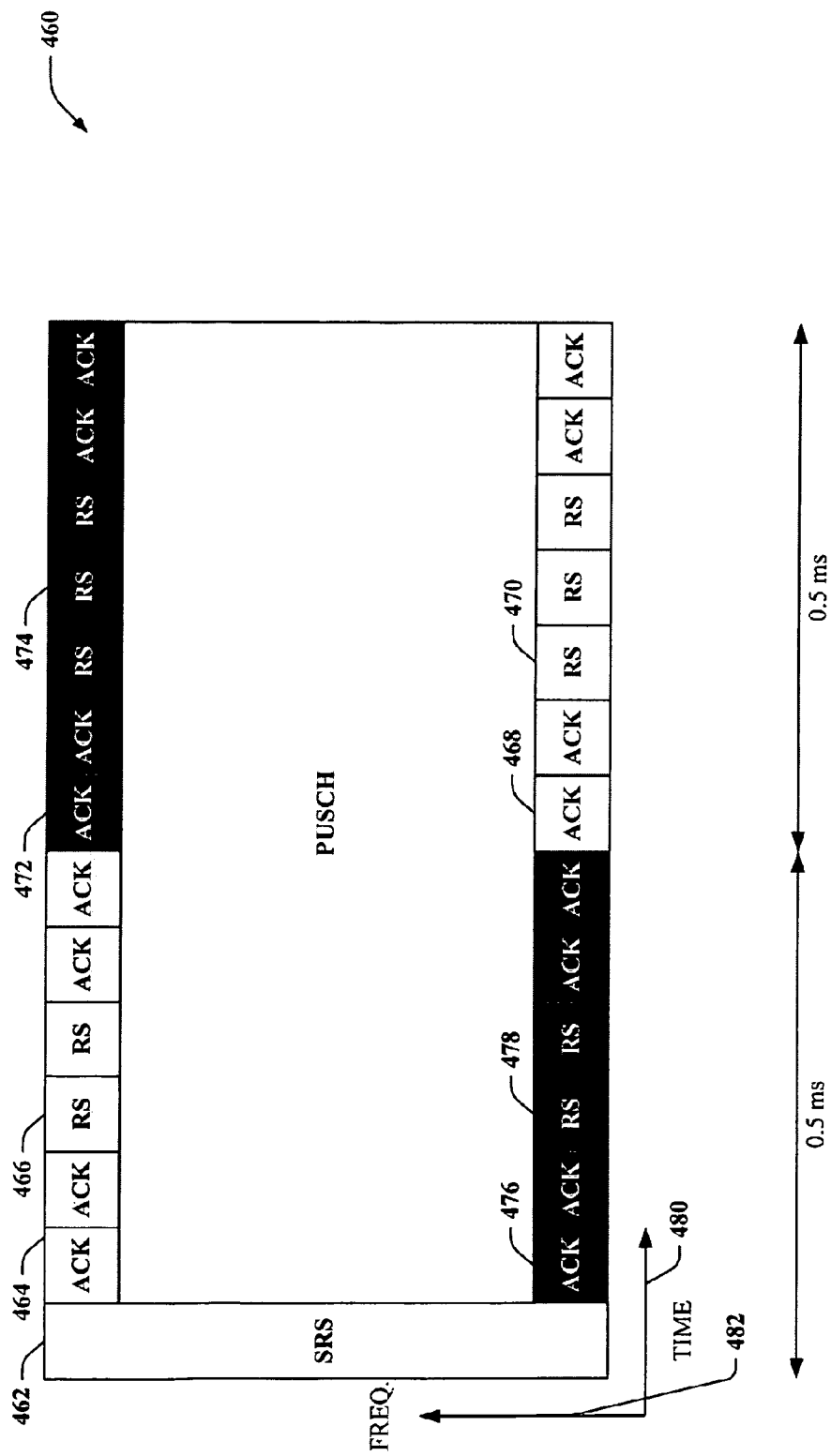
FIG. 4C is an illustration of an example sub-frame depicting ACK channel multiplexing when a sounding RS is present and a RS symbol is replaced.

Now referring to FIG. 4C, example sub-frame 460 depicting ACK channel multiplexing when a sounding RS is present and a RS symbol is replaced is illustrated. Again, like sub-frame 400 of FIG. 4A, frequency 482 is once more represented along the y-axis, and sub-frame 460 represents 1.0 ms of time 480 depicted in the x-axis dimension. The 1.0 ms can be divided into two 0.5 ms slots, each similar to the channel structure described in FIG. 2A, with 7 symbols per slot (e.g., short CP), but only one slot in sub-frame 460 includes a sound RS. Similar to sub-frame 430 of FIG. 4B, SRS 462 is again shown in the first position of the first 0.5 ms slot. However, in this case, the first 0.5 ms slot of sub-frame 460 maintains four ACK symbols 464, 476, yet includes only two RS symbols 466, 478, which is one fewer than in the first slots of sub-frames 400, 430. Thus, in this case, an RS symbol was replaces by SRS 462 rather than an ACK symbol as was the case in sub-frame 430. However, like sub-frame 430, no changes appear in the structure of the second slot over what was depicted in the nominal sub-frame 400 as illustrated by four ACK symbols 468, 472 and three RS symbols 470, 474 in the second 0.5 ms slot of sub-frame 460.

Figure 5A:
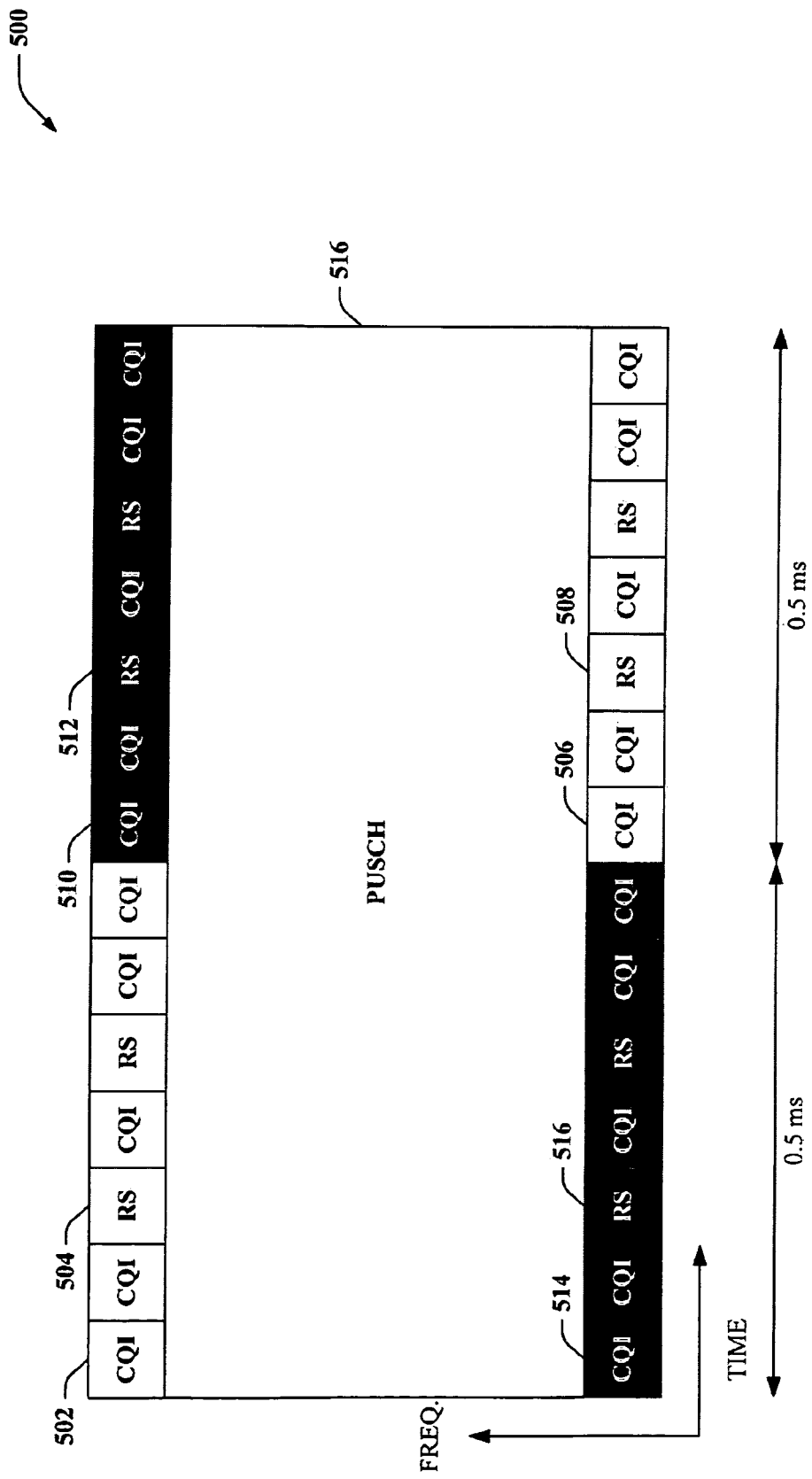
FIG. 5A is an illustration of a nominal example sub-frame 500 detailing CQI channel multiplexing in the absence of a sounding RS.

With reference to FIG. 5A, a nominal example sub-frame 500 detailing CQI channel multiplexing in the absence of a sounding RS is provided. Sub-frame 500 represents 1.0 ms of time that can be divided into two 0.5 ms slots similar to the channel structure described in FIG. 2A, yet with no sounding RS in either slot. Illustrated in the upper portion of the first 0.5 ms slot are five CQI symbols 502 and two RS symbols 504, which make up the 7 symbols available in short CP structure. Likewise, at the lower portion of the frequency spectrum are five CQI symbols 514 and two RS symbols 516. While the PUSCH 516 region can hop at sub-frame boundaries, the PUCCH channel can be hopped at slot boundaries. Thus, the five CQI symbols 506 in the second 0.5 ms slot correspond to the CQI symbols 502 whereas the five CQI symbols 510 correspond to CQI symbols 514. Similarly, RS symbols 504, 516 in the first slot correspond to RS symbols 508, 512, respectively in the second slot of sub-frame 500.

Figure 5B:
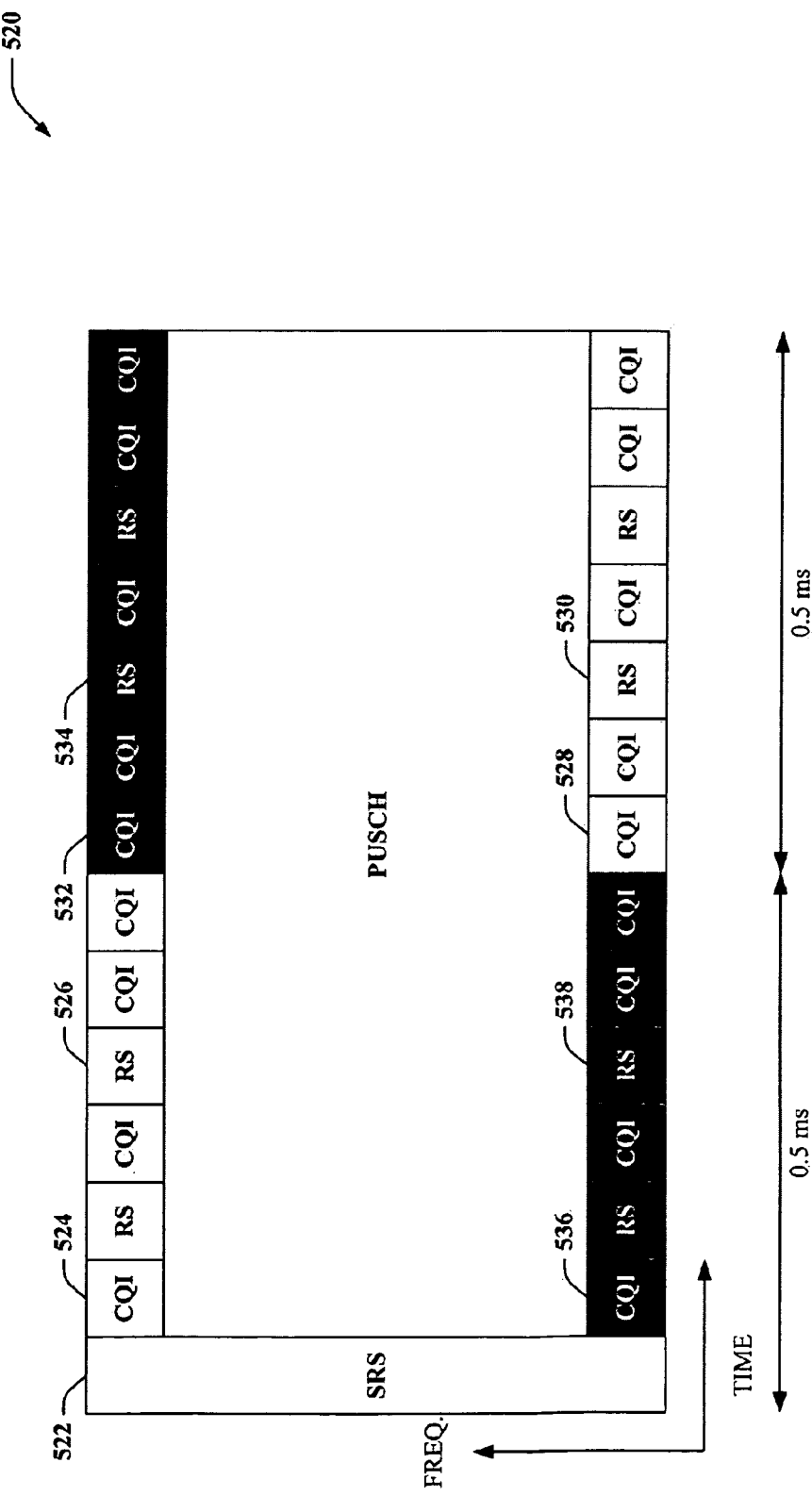
FIG. 5B is an illustration of an example subframe detailing CQI channel multiplexing when a sounding RS is present and a CQI symbol is replaced.

Turning next to FIG. 5B, example sub-frame 520 detailing CQI channel multiplexing when a sounding RS is present and a CQI symbol is replaced is depicted. As with sub-frame 500 of FIG. 5A, sub-frame 520 represents 1.0 ms of time that can be divided into a first and a second slot, each of 0.5 ms and each similar to the short CP structure described in FIG. 2A, yet with a SRS in only one of the two slots and the CQI information transmitted in the PUCCH regions. In this case, there is no sounding RS in the second slot. Once more, for illustrative purposes, the sounding RS, SRS 522, is in the first position in the first 0.5 ms slot although SRS 522 could exist elsewhere.

In contrast to the example nominal sub-frame 500 of FIG. 5A, the first slot in sub-frame 430 includes four CQI symbols 524 (and four CQI symbols 536 in the lower frequency portion) rather than the five CQI symbols 502 (and 514) in sub-frame 500. However, the number of RS symbols 526 and 538 remains the same with two for each frequency portion. In this case, SRS 522 replaces one of the CQI symbols 524, 536 in the first slot. Otherwise, the second slot of sub-frame 520 is substantially the same in structure as sub-frame 500, with five CQI symbols 532, 528 and two RS symbols 534, 530.

Figure 5C:
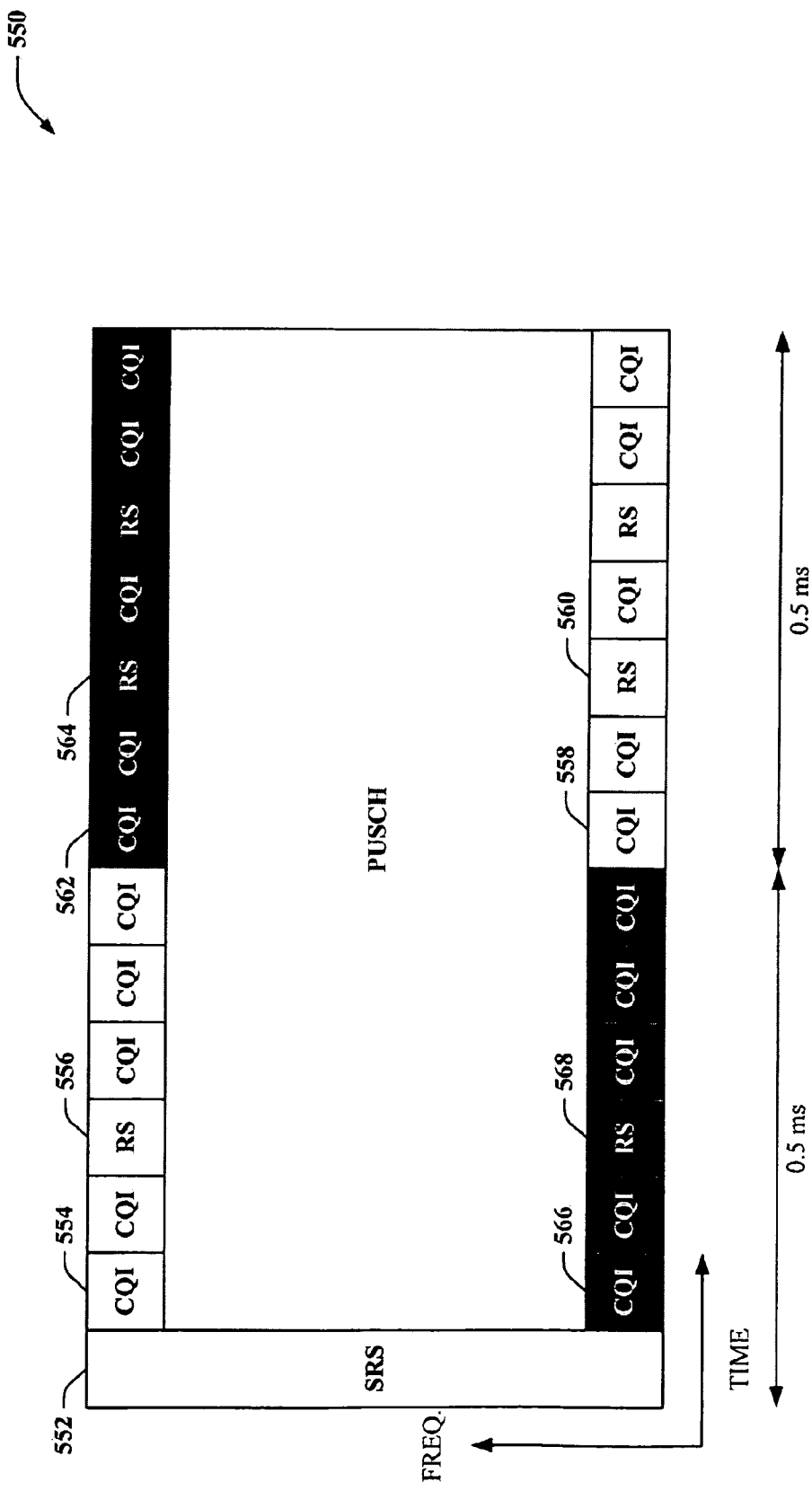
FIG. 5C is an illustration of an example sub-frame block depicting CQI channel multiplexing when a sounding RS is present and a RS symbol is replaced

With reference now to FIG. 5C, example sub-frame 550 depicting CQI channel multiplexing when a sounding RS is present and a RS symbol is replaced is illustrated. Again, like sub-frame 500 of FIG. 5A, sub-frame 550 represents 1.0 ms of time that can be segmented into two 0.5 ms slots, each similar to the short. CP channel structure described in FIG. 2A, yet with a SRS in only one of the two slots of sub-frame 550. Similar to sub-frame 520 of FIG. 5B, SRS 552 is again shown in the first position of the first 0.5 ms slot However, in this case, the first 0.5 ms slot of sub-frame 550 maintains all five CQI symbols 554, 566, yet includes only one RS symbol 556, 568, which is one fewer than in the first slots of sub-frames 500, 520. Thus, in this case, an RS symbol was replaced by SRS 552 rather than a CQI symbol as was the case in sub-frame 520. However, like sub-frame 520, no changes appear in the structure of the second slot over what was depicted in the nominal sub-frame 500 as illustrated by five CQI symbols 558, 562 and two RS symbols 560, 564 in the second 0.5 ms slot of sub-frame 550.

With the foregoing in mind and referring back to FIG. 3, wireless communication apparatus 302 can further include SRS detector 310 that can detect a SRS symbol in a slot of a sub-frame. For example, SRS detector 310 can detect a SRS symbol such as one of those presented in the first 0.5 ms slot of sub-frames 430, 460, 520, or 550 of FIGS. 4B, 4C, 5B, 5C, respectively. If no SRS symbol is detected in the resource block, appreciably, the channel structure will appear substantially similar to sub-frames 400 or 500 of FIGS. 4A and 5A, respectively, depending upon whether an ACK channel or a CQI channel is being examined and/or multiplexed.

Wireless communication apparatus 302 can also include structure multiplexer 312 that can modify a channel structure of at least one slot in the sub-frame. In particular, structure multiplexer 312 can multiplex an SRS with an ACK channel or a CQI channel. Thus, when a SRS is detected in a slot of the sub-frame by SRS detector 310, structure multiplexer 312 can modify the channel structure by replacing one of the symbols in the slot in which the SRS is detected with the SRS symbol. In one embodiment, structure muitiplexer 312 can modify the channel structure by reducing the number of ACK symbols in the slot including the SRS. This case can be substantially similar to a transition from sub-frame 400 to sub-frame 430, where SRS 432 of FIG. 4B replaces one of the ACK symbols 402, 414 of the first 0.5 ms slot of FIG. 4A.

In one embodiment, structure multiplexer 312 can modify the channel structure by reducing the number of CQI symbols in the slot including the SRS. This case can be substantially similar in nature to a transition from sub-frame 500 to sub-frame 520, wherein SRS 522 of FIG. 5B replaces one of the CQI symbols 502, 514 of the first 0.5 ms slot of FIG. 5A. In one embodiment, structure multiplexer 312 can modify the channel structure by reducing the number of RS symbols in the slot including the SRS. Appreciably, replacing a RS symbol can occur in either an ACK channel or a CQI channel. Accordingly, in one case this aspect can be substantially similar to a transition from sub-frame 400 to sub-frame 460, where an RS symbol 404, 416 is removed from the first slot of the ACK channel to allow for the addition of the SRS 462. In a second case, this aspect can be substantially similar to a transition from sub-frame 500 to sub-frame 550, wherein an RS symbol 504, 516 is omitted from the first slot of the CQI channel to make room for the SRS 552.

Furthermore, wireless communication apparatus 302 can include spreading coder 314 that can determine a length and a type of a time domain orthogonal spreading code to apply to slots of a sub-frame as a function of SRS presence. Thus, spreading coder 314 can determine a different spreading code to apply to individual slots of a sub-frame based upon whether the slot includes an SRS or not. To provide concrete examples of various cases, FIGS. 4B and 4C can again be referenced.

Referring back to FIG. 4B, the first slot of the ACK channel includes three ACK symbols, three RS symbols, and the SRS that replaced one of the previously existing ACK symbols. The second slot has no SRS, four ACK symbols and three RS symbols. In one embodiment, spreading coder 314 can apply a 3-point discrete Fourier transform (DFT) spreading code in the slot including the SRS (e.g., the first 0.5 ms slot) for both ACK symbols and RS symbols, wherein the determined length and type are represented by 3-point (e.g., length) DFT (e.g., type). Since, the length and/or type of time domain orthogonal spreading code can differ for slots without an SRS, different spreading codes can apply to the second slot in sub-frame 430. The second slot in this example includes four ACK symbols and three RS symbols. In one embodiment, spreading coder 314 can apply a 4-point orthogonal spreading code for ACK symbols in the second slot, wherein the 4-point orthogonal spreading code can be of type Hadamard or DFT, and can further apply a 3-point DFT spreading code to RS symbols in the second slot.

It should be appreciated that while the nominal structure allows for 18 ACKs per resource block, the multiplexing of SRS and the ACK channel can still provide for 18 ACKs per resource block. Accordingly, there need not necessarily be any change in ACK multiplexing capacity for low Doppler.

As indicated supra, the claimed subject matter can also apply to long CP. As an example of such a case, in an embodiment, spreading coder 314 can apply in the slot including the SRS a 3-point DFT spreading code for ACK symbols and a 2-point orthogonal spreading code (e.g., Hadamard or DFT) for RS symbols. For the second slot, spreading coder 314 can apply a 4-point orthogonal spreading code for ACK symbols and a 2-point orthogonal spreading code for RS symbols. While the nominal structure allows for 8 ACKs per resource block for long CP structure, the multiplexed channel can still provide for 8 ACKs per resource block and, thus, no change in ACK multiplexing capacity.

Next, turning again to FIG. 4C, the first slot of the ACK channel includes four ACK symbols, two RS symbols, and the SRS that replaced one of the previously existing RS symbols. The second slot has no SRS, four ACK symbols and three RS symbols. In one embodiment, spreading coder 314 can apply either a 2-point or a 4-point DFT spreading code in the slot including the SRS (e.g., the first 0.5 ms slot) for ACK symbols. In one embodiment, spreading coder 314 can apply a 4-point orthogonal spreading code for ACK symbols in the second slot, and can further apply a 3-point DFT spreading code to RS symbols in the second slot. As with the nominal structure, the multiplexed structure allows for 12 ACKs per resource block. There can be reduced ACK multiplexing capacity for low Doppler, yet can be optimized for high (e.g., SF=2) Doppler configuration. In other words, the same multiplexing capacity as the nominal can be achieved for SF=2 configuration.

In one embodiment, the aspects described supra, wherein spreading coder 314 determines a length and type of orthogonal spreading code for ACK symbols and RS symbols in the ACK channel can apply to other channels in the PUCCH region, such as the CQI channel. Accordingly, coding spreading can determine a length and a type of a time domain orthogonal spreading code for each slot of the sub-frames 520 and 550 of FIGS. 5B and 5C, respectively, wherein structure multiplexer 312 replaced a CQI symbols (e.g., sub-frame 520) or an RS symbol (e.g., sub-frame 550). Such can be accomplished in a manner substantially similar to that described herein. In a first structure (e.g., sub-frame 520), where a CQI symbol is replaced by the SRS, it should be appreciated that the effective code of CQI is increased. In a second structure (e.g., sub-frame 550), wherein an RS symbol is replaced by the SRS, the effective code rate is generally unchanged, and the channel estimation losses can be slightly higher in the first slot. It should be further appreciated that 6 CQIs can be transmitted per resource block in both structures. Accordingly, there is typically no change to CQI multiplexing capacity.

Figure 6:
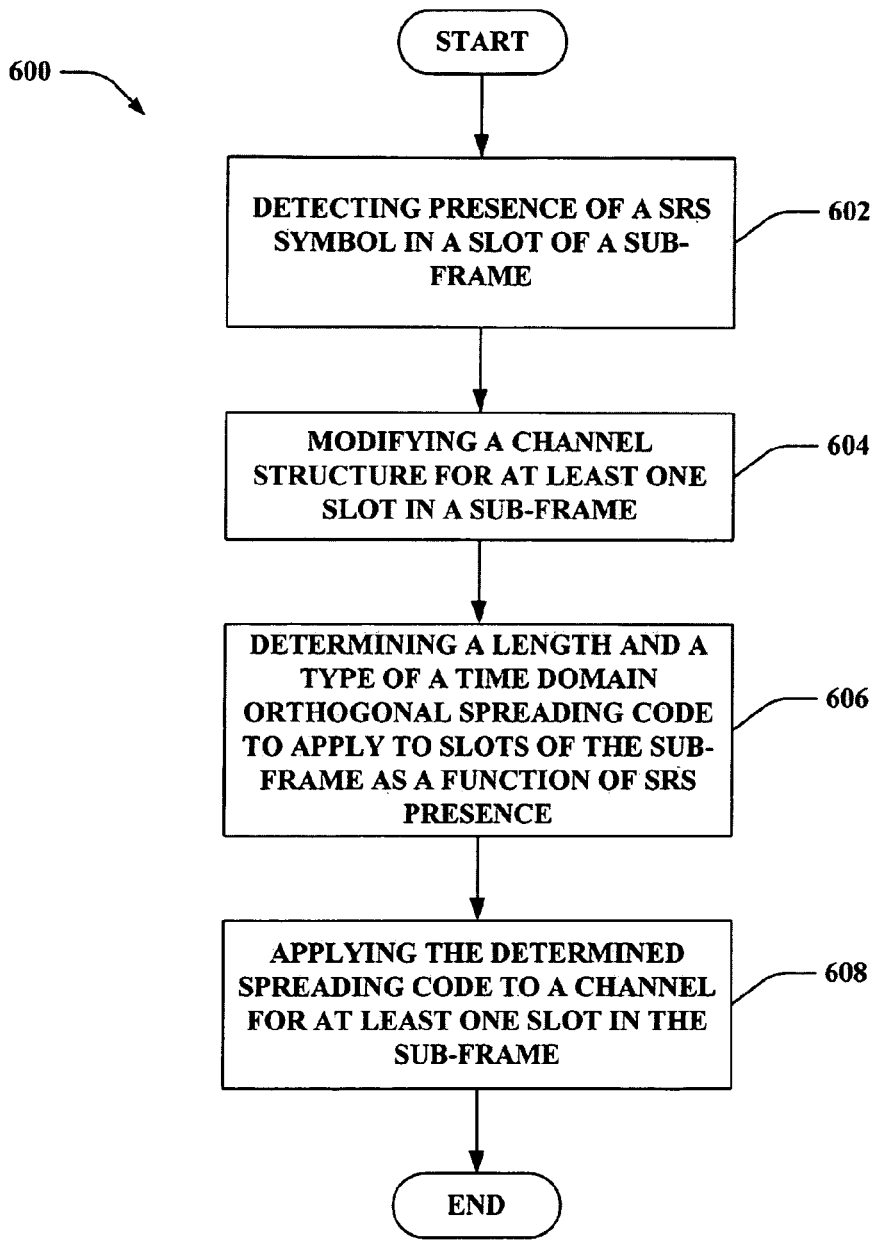
FIG. 6 is an illustration of an example methodology for facilitating multiplexing of a SRS in a wireless communication environment.
Figure 7:
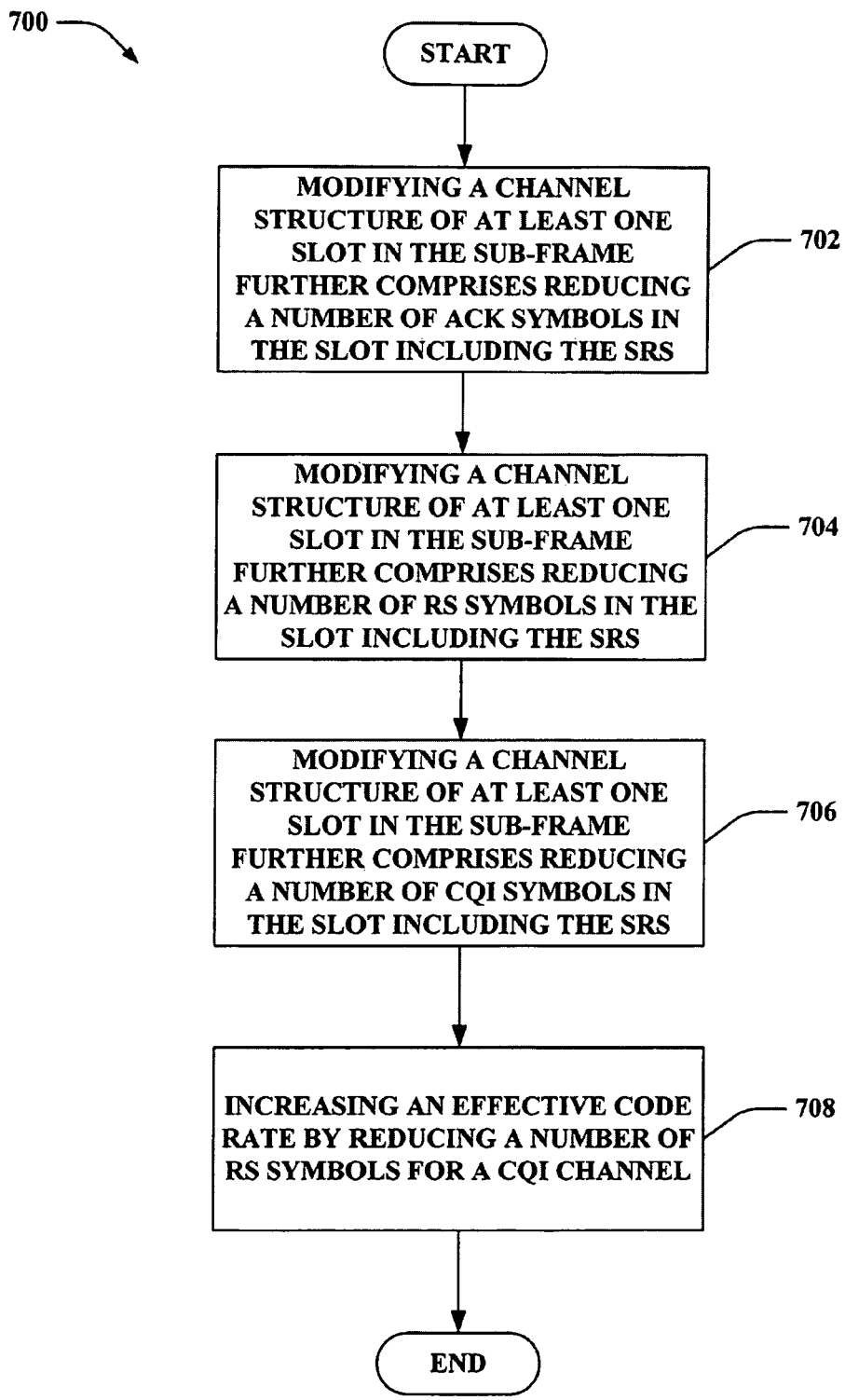
FIG. 7 is an illustration of an example methodology that facilitates various further aspects of modifying a channel structure for multiplexing an SRS in a wireless communication environment.

Referring to FIGS. 6 and 7, methodologies relating to effectuating multiplexing of a SRS are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 6, illustrated is a methodology 600 for facilitating multiplexing of a SRS in a wireless communication environment. At 602, a SRS symbol can be detected in a slot of a sub-frame. Typically, a sub-frame represents 1.0 ms and can be comprised of two 0.5 ms slots. The SRS can potentially exist in either the first or the second slot, but in either case can be detected to exist in the sub-frame, at some location in one of the two slots. At 604, a channel structure for at least one slot in the sub-frame can be modified. For example, either an ACK symbol, a CQI symbol or a RS symbol can be removed and the SRS added in its place in the slot where the SRS is detected at 602.

At 606, a type and a length of a time domain orthogonal spreading code can be determined to apply to slots of the sub-frame as a function of SRS presence. The type can be, e.g., Hadamard or DFT and the length can be, e.g., 2-point, 3-point, 4-point and so forth. The type and length of time domain spreading code for a given slot can be determined based upon whether the SRS is present or absent from that particular slot. At 608, the determined spreading code can be applied to at least one slot in the sub-frame.

Turning to FIG. 7, illustrated is a methodology 700 that facilitates various further aspects of modifying a channel structure for multiplexing an SRS in a wireless communication environment. At 702, modifying a channel structure for at least one slot in the sub-frame can further comprise reducing a number of ACK symbols in the slot including the SRS. At 704, modifying a channel structure for at least one slot in the sub-frame can further comprise reducing a number of RS symbols in the slot including the SRS. At 706, modifying a channel structure for at least one slot in the sub-frame can further comprise reducing a number of CQI symbols in the slot including the SRS. Appreciably, in each case, the reduced symbol in the associated slot can provide space for the SRS.

Figure 8:
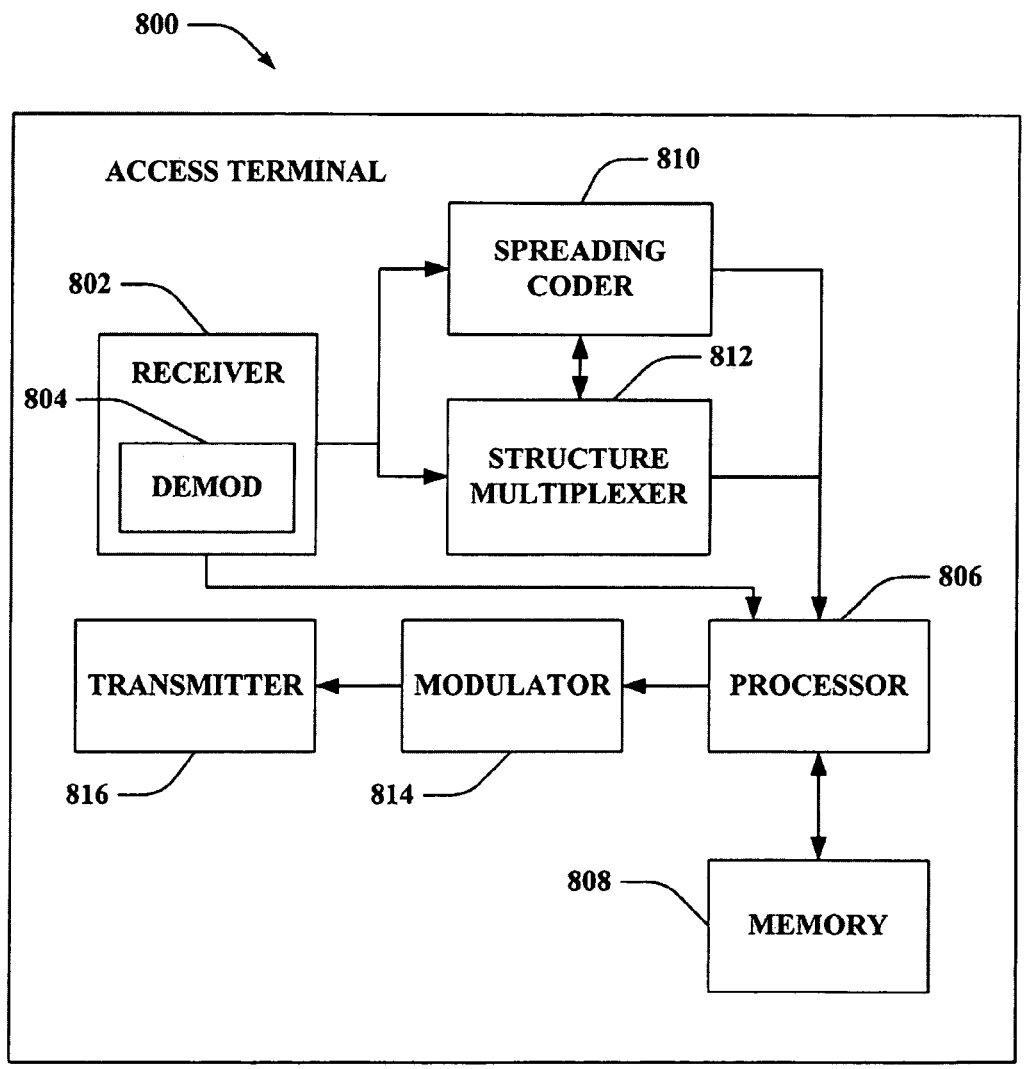
FIG. 8 is an illustration of an example an access terminal that facilitates multiplexing of a SRS channel in a wireless communications environment.

FIG. 8 is an illustration of an access terminal 800 that facilitates multiplexing of a SRS channel in a wireless communications environment. Access terminal 800 comprises a receiver 802 that receives a signal from, for instance, a receive antenna (not shown), and performs typical actions thereon (e.g., filters, amplifies, downconverts, etc.) the received signal and digitizes the conditioned signal to obtain samples. Receiver 802 can be, for example, an MMSE receiver, and can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of access terminal 800, and/or a processor that both analyzes information received by receiver 802, generates information for transmission by transmitter 816, and controls one or more components of access terminal 800.

Access terminal 800 can additionally comprise memory 808 that is operatively coupled to processor 806 and that can store data to be transmitted, received data, and any other suitable information related to performing the various actions and functions set forth herein. Memory 808 can additionally store protocols and/or algorithms associated with circular buffer based rate matching.

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The memory 808 of the subject systems and methods is intended to comprise, without being limited to, these and any other suitable types of memory.

Receiver 802, which can be substantially similar to receiver 306 of FIG. 3, is further operatively coupled to spreading coder 810 and/or structure multiplexer 812, which can be substantially similar to spreading coder 314 of FIG. 3 and structure multiplexer 312, respectively of FIG. 3. Moreover, although not shown, it is contemplated that access terminal 800 can include a SRS detector substantially similar to SRS detector 310 of FIG. 3. Accordingly, access terminal 800 can detect a SRS symbol in a slot (e.g., by utilizing a SRS detector), employ the structure multiplexer 812 to modify a channel structure for at least one slot in the sub-frame, access the spreading coder 810 to determine a length and a type of a time domain orthogonal spreading code to apply to slots of the sub-frame as a function of SRS presence, and further to apply the determined spreading code to a channel of at least one slot in the sub-frame.

Figure 9:
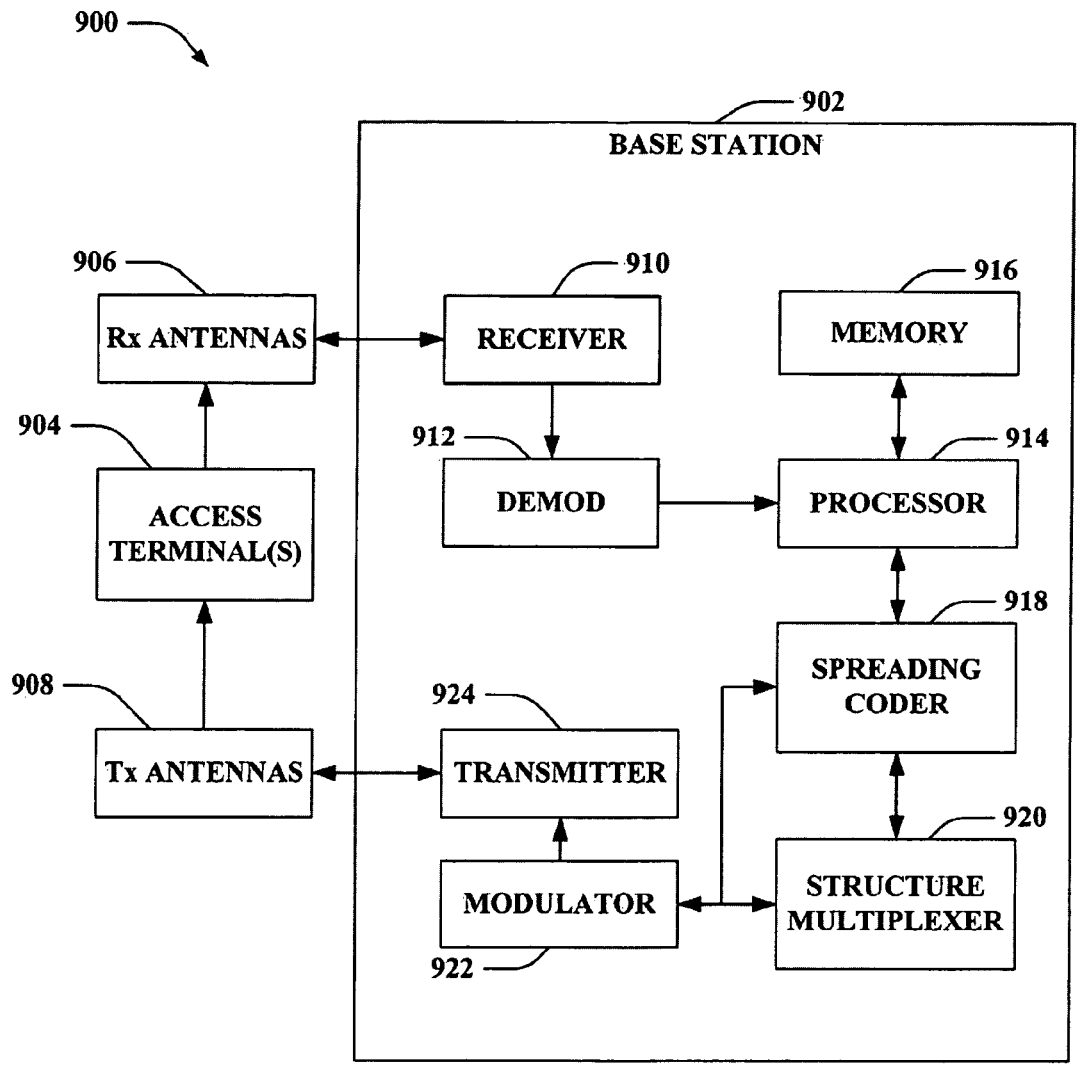
FIG. 9 is an illustration of an example base station that facilitates multiplexing of a SRS in a wireless communication environment.

FIG. 9 is an illustration of a system 900 that facilitates multiplexing of a SRS in a wireless communication environment. System 900 comprises a base station 902 (e.g., access point, . . . ) with a receiver 910 that receives signal(s) from one or more access terminals 904 through a plurality of receive antennas 906, and a transmitter 922 that transmits to the one or more access terminals 904 through a transmit antenna 908. Receiver 910 can receive information from receive antennas 906 and is operatively associated with a demodulator 912 that demodulates received information. Demodulated symbols are analyzed by a processor 914 that can be similar to the processor described above with regard to FIG. 8, and which is coupled to a memory 916 that stores data to be transmitted to or received from access terminal(s) 904 (or a disparate base station (not shown)) and/or any other suitable information related to performing the various actions and functions set forth herein. Processor 914 is further coupled to a spreading coder 918 that can determine a length and a type of a time domain orthogonal spreading code to apply to slots of the sub-frame as a function of SRS presence and/or absence.

Spreading coder 918 can be operatively coupled to a structure multiplexer 920 that can modify a channel structure for at least one slot in the sub-frame. Moreover, although not shown, it is contemplated that base station 902 can include SRS detector substantially similar to SRS detector 310 of FIG. 3. Spreading coder 918 and structure multiplexer 920 can provide data to be transmitted to a modulator 922. For example, the data to be transmitted that which is included in a PUCCH channel (e.g., an ACK or CQI channel) that is multiplexed with an SRS. Modulator 922 can multiplex the frame for transmission by a transmitter 926 through antenna 908 to access terminal(s) 904. Although depicted as being separate from the processor 914, it is to be appreciated that interleaver 918, interlacer 920 and/or modulator 922 can be part of processor 914 or a number of processors (not shown).

Figure 10:
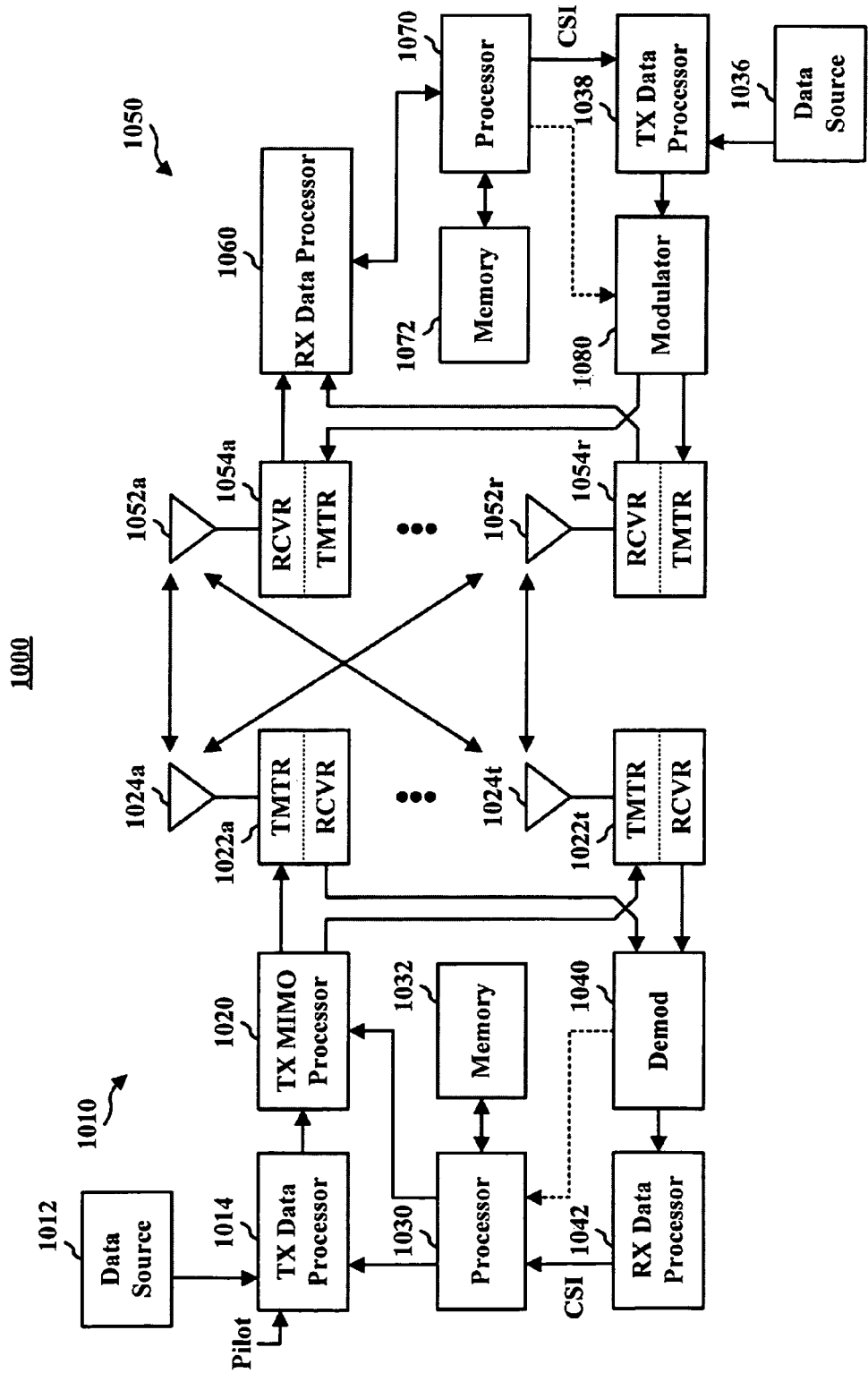
FIG. 10 is an illustration of an example wireless network environment that can be employed in conjunction with the various systems and methods described herein.

FIG. 10 shows an example wireless communication system 1000. The wireless communication system 1000 depicts one base station 1010 and one access terminal 1050 for sake of brevity. However, it is to be appreciated that system 1000 can include more than one base station and/or more than one access terminal, wherein additional base stations and/or access terminals can be substantially similar or different from example base station 1010 and access terminal 1050 described below. In addition, it is to be appreciated that base station 1010 and/or access terminal 1050 can employ the systems (FIGS. 1, 3, 8-9, and 11) and/or methods (FIGS. 6 and 7) described herein to facilitate wireless communication there between.

At base station 1010, traffic data for a number of data streams is provided from a data source 1012 to transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed. (TDM), or code division multiplexed (CDM). The pilot data is typically a known data pattern that is processed in a known manner and can be used at access terminal 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At access terminal 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and down-converts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which available technology to utilize as discussed above. Further, processor 1070 can formulate a reverse link message comprising a matrix index portion and a rank value portion.

The reverse link message can comprise various types of information regarding the communication link and/or the received data steam. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from access terminal 1050 are received by antennas 1024, conditioned by receivers 1022, demodulated by a demodulator 1040, and processed by a RX data processor 1042 to extract the reverse link message transmitted by access terminal 1050. Further, processor 1030 can process the extracted message to determine which precoding matrix to use for determining the beamforming weights.

Processors 1030 and 1070 can direct (e.g., control, coordinate, manage, etc.) operation at base station 1010 and access terminal 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCE), which is a DL channel that transfers paging information. Moreover, the Logical Control Charnels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
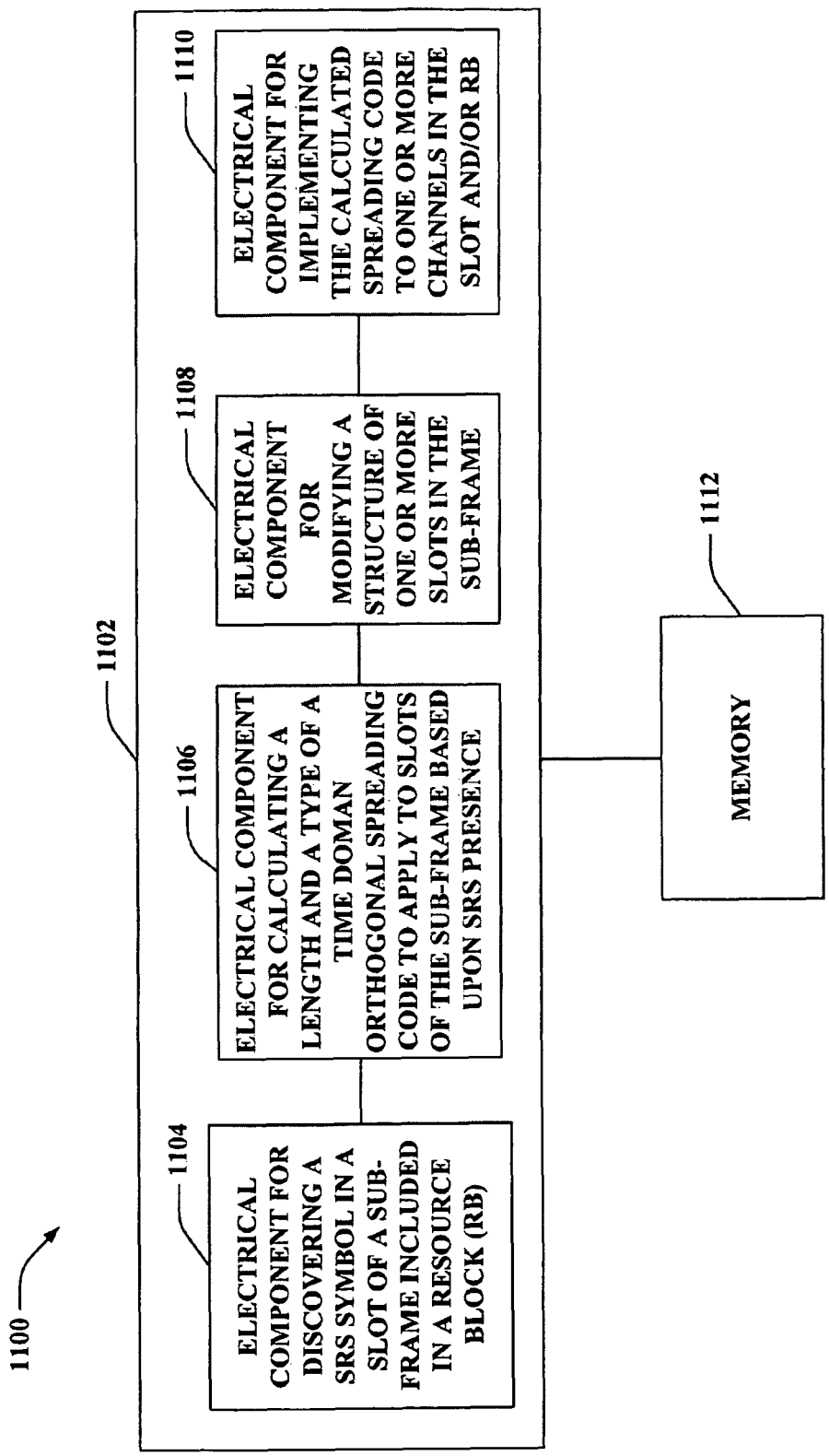
FIG. 11 is an illustration of an example system of electrical components that enables that enables multiplexing of a SRS channel in a wireless communication environment.

With reference to FIG. 11, illustrated is a system 1100 that enables multiplexing of a SRS channel in a wireless communication environment. For example, system 1100 can reside at least partially within a base station. According to another illustration, system 1100 can reside at least partially within an access terminal. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction.

For instance, logical grouping 1102 can include an electrical component for discovering a SRS symbol in a slot of a sub-frame included in a resource block 1104. Further, logical grouping 1102 can comprise an electrical component for calculating a length and a type of a time domain spreading code to apply to slots of the sub-frame based upon SRS presence 1106. Moreover, logical grouping 1102 can include an electrical component for modifying a channel structure of one or more slots in the sub-frame 1108. Logical grouping 1102 can also include an electrical component for implementing the calculated spreading code to one or more channels in the slot and/or resource block 1110. For example, a SRS detected in a slot of a resource block can be multiplexed-with other data channels in the PUCCH regions such as, e.g., a CQI or ACK channel. In accordance therewith, the SRS can be discovered or detected in a slot of a resource block. The channel structure for that slot can then be modified, for instance, by reducing in the slot with the SRS a number of symbols. Thus, the number of ACK, CQI, or RS symbols can be reduced to provide a position for the SRS. The remaining 5 (for long CP) or 6 (for short CP) symbols can be structured with time domain spreading codes, of which the type and length can be determined as a function of SRS presence or absence in the slot. Additionally, system 1100 can include a memory 1112 that retains instructions for executing functions associated with electrical components 1104, 1106, 1108, and 1110. While shown as being external to memory 1112, it is to be understood that one or more of electrical components 1104, 1106, 1108, and 1110 can exist within memory 1112.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for facilitating multiplexing of a sounding resource signal (SRS) in a wireless communication environment, comprising:
   detecting presence of a SRS symbol in a slot of a sub-frame;
   modifying a channel structure for at least one slot of the sub-frame;
   determining a length and a type of a time domain orthogonal spreading code to apply to a channel in the slots of the sub-frame as a function of SRS presence; and
   applying the determined spreading code to the channel in at least one slot in the sub-frame.

2. The method of claim 1, modifying a channel structure for at least one slot of the sub-frame further comprises reducing a number of acknowledgement (ACK) symbols in the slot including the SRS.

3. The method of claim 2, applying the determined spreading code to the channel in at least one slot in the sub-frame further comprises applying a 3-point discrete Fourier transform (DFT) spreading code in the slot including the SRS for both ACK symbols and reference signal (RS) symbols.

4. The method of claim 2, applying the determined spreading code to the channel in at least one slot in the sub-frame further comprises applying in a second slot a 4 point orthogonal spreading code for ACK symbols and applying a 3-point DFT spreading code for RS symbols, the orthogonal spreading code being Hadamard or DFT.

5. The method of claim 1, determining a length and a type of a time domain orthogonal spreading code to apply to the channel in the slots of the sub-frame as a function of SRS presence further comprises employing a long cyclic prefix (CP) for the sub-frame.

6. The method of claim 5, applying the determined spreading code to the channel in at least one slot in the sub-frame further comprises applying in the slot including the SRS a 3-point DFT spreading code for ACK symbols and applying a 2-point orthogonal spreading code for RS symbols.

7. The method of claim 5, applying the determined spreading code to the channel in at least one slot in the sub-frame further comprises applying in a second slot a 4 point orthogonal spreading code for ACK symbols and applying a 2-point orthogonal spreading code for RS symbols.

8. The method of claim 1, modifying a channel structure for at least one slot of the sub-frame further comprises reducing a number of RS symbols in the slot including the SRS.

9. The method of claim 8, applying the determined spreading code to the channel in at least one slot in the sub-frame further comprises applying in the slot including the SRS a 2-point or 4-point DFT spreading code for ACK symbols and applying a 2-point DFT spreading code for RS symbols.

10. The method of claim 8, applying the determined spreading code to the channel in at least one slot in the sub-frame further comprises applying in a second slot a 4-point orthogonal spreading code for ACK symbols and applying a 3-point DFT spreading code for RS symbols.

11. The method of claim 1, modifying a channel structure for at least one slot of the sub-frame further comprises reducing a number of channel quality indication (CQI) symbols in the slot including the SRS.

12. The method of claim 11, further comprising increasing an effective code rate by reducing a number of RS symbols for a CQI channel.

13. A wireless communication apparatus, comprising:
   a memory that retains instructions related to discovering presence of a SRS symbol in a slot of a sub-frame, modifying a channel structure for one or more slots in the sub-frame, calculating a type and a length of a time domain orthogonal spreading code to apply a channel in slots of the sub-frame based upon presence of the SRS in the slot, implementing the calculated spreading code in one or more slots of the sub-frame in the channel; and
   a processor, coupled to the memory, configured to execute the instructions retained in the memory.

14. The wireless communications apparatus of claim 13, the memory further retains instructions related to decreasing a number of ACK symbols in the slot including the SRS.

15. The wireless communications apparatus of claim 14, the memory further retains instructions related to implementing a 3-point DFT spreading code in the slot including the SRS for both ACK symbols and RS symbols.

16. The wireless communications apparatus of claim 14, the memory further retains instructions related to implementing in a second slot a 4 point orthogonal spreading code for ACK symbols and implementing a 3-point DFT spreading code for RS symbols.

17. The wireless communications apparatus of claim 13, the memory further retains instructions related to utilizing a long CP for the sub-frame.

18. The wireless communications apparatus of claim 17, the memory further retains instructions related to implementing in the slot including the SRS a 3-point DFT spreading code for ACK symbols and implementing a 2-point orthogonal spreading code for RS symbols.

19. The wireless communications apparatus of claim 17, the memory further retains instructions related to implementing in a second slot a 4 point orthogonal spreading code for ACK symbols and implementing a 2-point orthogonal spreading code for RS symbols.

20. The wireless communications apparatus of claim 13, the memory further retains instructions related to decreasing a number of RS symbols in the slot including the SRS.

21. The wireless communications apparatus of claim 20, the memory further retains instructions related to implementing in the slot including the SRS a 2-point or 4-point DFT spreading code for ACK symbols and implementing a 2-point DFT spreading code for RS symbols.

22. The wireless communications apparatus of claim 20, the memory further retains instructions related to implementing in a second slot a 4-point orthogonal spreading code for ACK symbols and implementing a 3-point DFT spreading code for RS symbols.

23. The wireless communications apparatus of claim 13, the memory further retains instructions related to decreasing a number of CQI symbols in the slot including the SRS.

24. The wireless communications apparatus of claim 23, the memory further retains instructions related to raising an effective code rate by decreasing a number of RS symbols for a CQI channel.

25. A wireless communications apparatus that facilitates multiplexing of a SRS, comprising:
means for detecting a SRS symbol in a slot of a sub-frame;
means for adjusting a channel structure for at least one slot in the sub-frame;
means for utilizing presence of the SRS for determining a type and a length of a time domain orthogonal spreading code to apply to a channel in one or more slots of the sub-frame; and
means for applying the determined spreading code to the channel for at least one slot in the sub-frame.

26. The wireless communication apparatus of claim 25, further comprising means for decrementing a number of ACK symbols in the slot including the SRS.

27. The wireless communication apparatus of claim 25, further comprising means for decrementing a number of RS symbols in the slot including the SRS.

28. The wireless communication apparatus of claim 25, further comprising means for decrementing a number of CQI symbols by one in the slot including the SRS.

29. The wireless communication apparatus of claim 28, further comprising means for increasing an effective code rate for a CQI channel.

30. A computer program product, comprising:
a non-transitory computer-readable medium comprising:
code for detecting a SRS symbol in a slot of a sub-frame;
code for changing a channel structure for a slot in the sub-frame;
code for determining both a type and a length of a time domain orthogonal spreading code to apply to a channel for one or more slots of the sub-frame as a function of SRS presence in the one or more slots; and
code for utilizing the determined spreading code for the channel in at least one slot in the sub-frame.

31. The computer program product of claim 30, the computer-readable medium further comprises code for reducing a number of ACK symbols in the slot including the SRS.

32. The computer program product of claim 31, the computer-readable medium further comprises code for utilizing a 3-point DFT spreading code in the slot including the SRS for both ACK symbols and RS symbols.

33. The computer program product of claim 31, the computer-readable medium further comprises code for utilizing in a second slot a 4 point orthogonal spreading code for ACK symbols and utilizing a 3-point DFT spreading code for RS symbols.

34. The computer program product of claim 30, the computer-readable medium further comprises code for employing a long CP for the sub-frame.

35. The computer program product of claim 34, the computer-readable medium further comprises code for utilizing in the slot including the SRS a 3-point DFT spreading code for ACK symbols and utilizing a 2-point orthogonal spreading code for RS symbols.

36. The computer program product of claim 34, the computer-readable medium further comprises code for utilizing in a second slot a 4 point orthogonal spreading code for ACK symbols and utilizing a 2-point orthogonal spreading code for RS symbols.

37. The computer program product 30, the computer-readable medium further comprises code for reducing a number of RS symbols in the slot including the SRS.

38. The computer program product of claim 37, the computer-readable medium further comprises code for utilizing in the slot including the SRS a 2-point or 4-point DFT spreading code for ACK symbols and utilizing a 2-point DFT spreading code for RS symbols.

39. The computer program product of claim 37, the computer-readable medium further comprises code for utilizing in a second slot a 4-point orthogonal spreading code for ACK symbols and utilizing a 3-point DFT spreading code for RS symbols.

40. The computer program product of claim 30, the computer-readable medium further comprises code for reducing a number of CQI symbols in the slot including the SRS.

41. The computer program product of claim 40, the computer-readable medium further comprises code for increasing an effective code rate by reducing a number of RS symbols for a CQI channel.

42. A method for facilitating multiplexing of a SRS in an ACK channel in a wireless communication environment, comprising:
detecting presence of a SRS symbol in a slot of a sub-frame;
modifying an ACK channel structure for at least one slot of the sub-frame;
determining a length and a type of a time domain orthogonal spreading code to apply to an ACK channel in the slots of the sub-frame as a function of SRS presence; and
applying the determined spreading code to the ACK channel in at least one slot in the sub-frame.

43. The method of claim 42, modifying an ACK channel structure for at least one slot of the sub-frame further comprises reducing a number of at least one of ACK symbols or RS symbols in the ACK channel slot including the SRS.

44. A wireless communication apparatus, comprising:
a memory that retains instructions related to discovering presence of a SRS symbol in a slot of a sub-frame, modifying an ACK channel structure for one or more slots in the sub-frame, calculating a type and a length of a time domain orthogonal spreading code to apply an ACK channel in slots of the sub-frame based upon presence of the SRS in the slot, implementing the calculated spreading code in one or more slots of the sub-frame in the ACK channel; and
a processor, coupled to the memory, configured to execute the instructions retained in the memory.

45. A wireless communications apparatus that facilitates multiplexing of a SRS in an ACK channel, comprising:
means for detecting a SRS symbol in a slot of a sub-frame;
means for adjusting an ACK channel structure for at least one slot in the sub-frame;
means for utilizing presence of the SRS for determining a type and a length of a time domain orthogonal spreading code to apply to an ACK channel in one or more slots of the sub-frame; and means for applying the determined spreading code to the ACK channel for at least one slot in the sub-frame.

46. A computer program product, comprising:

a non-transitory computer-readable medium comprising:

code for detecting a SRS symbol in a slot of a sub-frame;

code for changing an ACK channel structure for a slot in the sub-frame;

code for determining both a type and a length of a time domain orthogonal spreading code to apply to an ACK channel for one or more slots of the sub-frame as a function of SRS presence in the one or more slots; and code for utilizing the determined spreading code for the ACK channel in at least one slot in the sub-frame.

* * * * *